United States Patent
Kobayashi et al.

(10) Patent No.: US 9,963,601 B2
(45) Date of Patent: May 8, 2018

(54) PHOTOCATIONICALLY CURABLE INK JET INK, METHOD OF MANUFACTURING PHOTOCATIONICALLY CURABLE INK JET INK, PRINTED MATTER, AND METHOD OF MANUFACTURING PRINTED MATTER

(71) Applicant: TOKYO PRINTING INK MFG. CO., LTD., Tokyo (JP)

(72) Inventors: Shigenori Kobayashi, Saitama (JP); Fumitaka Yamaguchi, Saitama (JP)

(73) Assignee: TOKYO PRINTING INK MFG. CO., LTD., Tokyo (JP)

( * ) Notice: Subject to any disclaimer, the term of this patent is extended or adjusted under 35 U.S.C. 154(b) by 28 days.

(21) Appl. No.: 15/027,364

(22) PCT Filed: Oct. 2, 2014

(86) PCT No.: PCT/JP2014/076415
§ 371 (c)(1),
(2) Date: Apr. 5, 2016

(87) PCT Pub. No.: WO2015/053164
PCT Pub. Date: Apr. 16, 2015

(65) Prior Publication Data
US 2016/0257828 A1 Sep. 8, 2016

(30) Foreign Application Priority Data
Oct. 7, 2013 (JP) .................................. 2013-209864

(51) Int. Cl.
| | | |
|---|---|---|
| *C09D 11/10* | (2014.01) | |
| *C09D 11/36* | (2014.01) | |
| *B41J 2/01* | (2006.01) | |
| *C09D 11/101* | (2014.01) | |
| *C09D 11/322* | (2014.01) | |
| *C09D 11/102* | (2014.01) | |

(52) U.S. Cl.
CPC .......... *C09D 11/101* (2013.01); *C09D 11/102* (2013.01); *C09D 11/322* (2013.01); *C09D 11/36* (2013.01); *B41J 2/01* (2013.01)

(58) Field of Classification Search
CPC ..... C09D 11/36; C09D 11/101; C09D 11/102; C09D 11/322; B41J 2/01
See application file for complete search history.

(56) References Cited

U.S. PATENT DOCUMENTS

| | | | |
|---|---|---|---|
| 7,473,718 B2 | 1/2009 | Ishikawa | |
| 7,728,050 B2* | 6/2010 | Watanabe | C08G 65/16 106/31.13 |
| 8,222,436 B2* | 7/2012 | Kyota | C07D 305/06 427/466 |
| 2003/0222960 A1 | 12/2003 | Takabayashi | |
| 2005/0288386 A1 | 12/2005 | Ishikawa | |
| 2007/0049651 A1* | 3/2007 | Watanabe | C08G 65/16 522/71 |
| 2007/0071952 A1* | 3/2007 | Watanabe | C09D 11/101 428/195.1 |
| 2007/0254977 A1 | 11/2007 | Sasa | |
| 2010/0079568 A1 | 4/2010 | Noguchi | |
| 2011/0102528 A1* | 5/2011 | Tsuchimura | C07C 311/48 347/102 |

FOREIGN PATENT DOCUMENTS

| | | |
|---|---|---|
| EP | 1357159 A2 | 10/2003 |
| JP | 2004243676 A2 | 9/2004 |
| JP | 2006008791 A2 | 1/2006 |
| JP | 2009280672 A2 | 12/2009 |
| JP | 2011153255 A2 | 8/2011 |
| JP | 2011208090 A2 | 10/2011 |

OTHER PUBLICATIONS

International Search Report dated Jan. 13, 2015 filed in PCT/JP2014/076415.
"The Latest / Optimization of UV Cured Resin", Technical Information Institute Co., Ltd., May 30, 2008, pp. 103 to 116.
Extended European Search Report dated Mar. 10, 2017 issued in the corresponding European patent application No. 14852265.9.

* cited by examiner

*Primary Examiner* — Sanza Mcclendon
(74) *Attorney, Agent, or Firm* — Rankin, Hill & Clark LLP

(57) ABSTRACT

A photocationically curable ink jet ink includes: a photoacid generator; a pigment; a monofunctional epoxy compound; a bifunctional epoxy compound; a monofunctional oxetane compound; and a bifunctional oxetane compound. In the photocationically curable ink jet ink, a concentration of the monofunctional epoxy compound is 20 wt % to 50 wt %, a concentration of the bifunctional epoxy compound is 20 wt % to 50 wt %, a concentration of the monofunctional oxetane compound is 5 wt % to 20 wt %, and a concentration of the bifunctional oxetane compound is 5 wt % to 20 wt %.

27 Claims, No Drawings

PHOTOCATIONICALLY CURABLE INK JET INK, METHOD OF MANUFACTURING PHOTOCATIONICALLY CURABLE INK JET INK, PRINTED MATTER, AND METHOD OF MANUFACTURING PRINTED MATTER

TECHNICAL FIELD

The present invention relates to an ink for a photocationically curable ink jet printer and a printed matter thereof.

BACKGROUND ART

An ink jet recording method can form an image simply and inexpensively and thus can be applied to various printing fields, for example, photography, various kinds of printing, and special printing such as marking and color filters. Recently, the ink jet recording method has also been used for printing on materials such as glass, resins, or metal. In this way, as not only paper but also other materials start to be used as a printing object, various methods have been developed, the methods including: a water-based ink jet method; a phase change ink jet method in which a solid wax ink is used at room temperature; a solvent-based ink jet method in which an ink containing a quick-drying organic solvent as a major component is used; and a UV ink jet method in which ultraviolet (UV) rays are used for crosslinking after recording.

In particular, the UV ink jet method is less malodorous than the solvent-based ink jet method, and with this method, an image can be formed on a recording medium having no quick-drying properties and no ink absorbency. Therefore, the UV ink jet method has been put into practice.

In the UV inkjet method, a radically curable material containing a (meth)acrylate material is mainly used. However, as compared to a radically curable material, a cationically curable material containing epoxy, vinyl ether, or oxetane has, for example, the following advantageous effects: (a) curing inhibition caused by oxygen is not likely to occur, and a thin film can be cured in the air; (b) the amount of shrinkage is small during curing, and adhesion is superior; and (c) even after curing by light irradiation, curing progresses due to a dark reaction (refer to Non-Patent Document 1). Therefore, recently, the cationically curable material has been increasingly applied to a coating material, an adhesive, a sealing agent for a display, a printing ink, three dimensional modeling, a silicone release paper, a photoresist, or a sealing agent for an electronic component.

In the ink jet printing field, for example, Patent Document 1 discloses an image forming method including: ejecting an active ray-curable ink, which contains a compound having an oxirane group and a compound having an oxetane ring as a photoacid generator and a photocationically polymerizable compound, from an inkjet recording head onto a recording material to print an image on the recording material. In this image forming method, after being landed on the recording material, the active ray-curable ink is cured with light having a wavelength of 210 nm to 280 nm. The image forming method is applicable to a non-absorbent recording material.

In addition, Patent Document 2 discloses a composition including: an epoxy group-containing silane coupling agent having both photocationic curability and silane coupling properties; and a photocationic polymerization initiator. According to the technique disclosed in Patent Document 2, it is possible to provide a photocationically curable composition that has superior adhesion with a substrate such as glass or a resin and is highly transparent after being cured; and a coating material and an ink for an ink jet printer that are formed of the composition.

RELATED DOCUMENT

Patent Document

[Patent Document 1] Japanese Unexamined Patent Publication No. 2004-243676
[Patent Document 2] Japanese Unexamined Patent Publication No. 2011-153255
[Non-Patent Document 1] "The Latest/Optimization of UV Cured Resin", Technical Information Institute Co., Ltd., May 30, 2008, pp. 103 to 116

DISCLOSURE OF THE INVENTION

However, it is described that an image can be formed on a non-absorbent recording material using the ink jet ink described in Patent Document 1 and that an image can be formed on glass using the composition described in Patent Document 2. However, when an image is formed on a coated surface for decoration, there is a problem in that peeling is likely to occur due to insufficient adhesion because the coated surface is cured with a curable resin in many cases.

In addition, in a coated object such as a building material which is used outdoors, in many cases, an inorganic pigment is used as a colorant for decoration in consideration of weather resistance. However, when an inorganic pigment is used, in many cases, UV curability is insufficient because the inorganic pigment blocks ultraviolet rays, and the dispersibility of an ink jet ink is also insufficient.

Accordingly, an object of the present invention is to provide a photocationically curable ink jet ink which can adhere to a coated surface formed of a curable resin and has superior dispersion stability and UV curability even when an inorganic pigment is used.

As a result of thorough investigation, the present inventors found that the above-described problems can be solved by optimizing the kinds of an epoxy compound and an oxetane compound, thereby completing the present invention.

That is, the present invention adopts the following configurations.

(1) A photocationically curable ink jet ink including:
a photoacid generator;
a pigment;
a monofunctional epoxy compound (excluding an organosiloxane having an epoxy group);
a bifunctional epoxy compound;
a monofunctional oxetane compound; and
a bifunctional oxetane compound.
(2) The photocationically curable ink jet ink according to (1),
in which a concentration of the monofunctional epoxy compound is 20 wt % to 50 wt %,
a concentration of the bifunctional epoxy compound is 20 wt % to 50 wt %,
a concentration of the monofunctional oxetane compound is 5 wt % to 20 wt %, and
a concentration of the bifunctional oxetane compound is 5 wt % to 20 wt %.
(3) The photocationically curable inkjet ink according to (1) or (2),
in which the monofunctional epoxy compound contains an alicyclic monoepoxide.

(4) The photocationically curable ink jet ink according to (3),
in which the alicyclic monoepoxide contains a monocarboxylic acid ester of alicyclic monoepoxide.

(5) The photocationically curable ink jet ink according to (3),
in which the alicyclic monoepoxide contains a higher alcohol diester of epoxyhexahydrophthalic acid.

(6) The photocationically curable ink jet ink according to (3),
in which the alicyclic monoepoxide contains a monocarboxylic acid ester of alicyclic monoepoxide and a higher alcohol diester of epoxyhexahydrophthalic acid.

(7) The photocationically curable ink jet ink according to any one of (1) to (6),
in which the bifunctional epoxy compound contains an alicyclic bifunctional epoxy compound.

(8) The photocationically curable ink jet ink according to any one of (1) to (7),
in which the pigment contains an inorganic pigment.

(9) The photocationically curable ink jet ink according to any one of (1) to (8),
in which when left to stand at 45° C. for 3 days, a viscosity increase rate is 0% or higher and 9% or lower.

(10) A method of manufacturing a photocationically curable ink jet ink,
the photocationically curable ink jet ink being the photocationically curable ink jet ink according to any one of (1) to (9), the method including:
a mixing-dispersing step of mixing at least a portion of the pigment with at least a portion of another component to obtain a pigment dispersion; and
a post-addition step of adding remaining components to the pigment dispersion.

(11) The method of manufacturing a photocationically curable ink jet ink according to (10),
in which the bifunctional epoxy compound is added only in the post-addition step.

(12) A method of manufacturing a printed matter, the method including:
a step of adhering the photocationically curable ink jet ink according to any one of (1) to (9) to a substrate; and
a step of irradiating the adhered photocationically curable ink jet ink with energy rays to cure the photocationically curable ink jet ink.

(13) A printed matter which is obtained using the method of manufacturing a printed matter according to (12).

(14) The printed matter according to (13),
in which a maximum ink film thickness of the cured photocationically curable ink jet ink on the substrate is 10 μm or more and 30 μm or less.

The photocationically curable ink jet ink according to the present invention exhibits superior photo-curability and dispersion stability even when an inorganic pigment is used, and a printed matter thereof has superior adhesion with a coated surface in which a curable resin is used.

DESCRIPTION OF EMBODIMENTS

Hereinafter, an embodiment of the present invention will be described in detail. This embodiment is merely an example for practicing the present invention. The present invention is not limited to the embodiment, and various modification examples can be adopted within a range not departing from the scope of the present invention.

Unless specified otherwise, "(a numerical value) to (a numerical value)" denotes a range equal to or more than (a numerical value) and equal to or less than (a numerical value).

A photocationically curable inkjet ink according to the present invention includes: a photoacid generator (F); a pigment (E); a monofunctional epoxy compound (A) (excluding an organosiloxane having an epoxy group); a bifunctional epoxy compound (B); a monofunctional oxetane compound (C); and a bifunctional oxetane compound (D).

The photocationically curable ink jet ink according to the embodiment is not particularly limited. In particular, the photocationically curable ink jet ink can be suitably applied to a coated surface and can be used as, for example, a photocationically curable ink jet ink for a coated surface.

In the photocationically curable ink jet ink according to the present invention, the monofunctional epoxy compound (A), the bifunctional epoxy compound (B), the monofunctional oxetane compound (C), and the bifunctional oxetane compound (D) can be used as photocationically polymerizable compounds.

(Monofunctional Epoxy Compound (A))

The photocationically curable ink jet ink according to the present invention contains one or more monofunctional epoxy compounds (A) as photocationically polymerizable compounds. Examples of the monofunctional epoxy compound (A) used in the present invention include an aromatic monoepoxide, an alicyclic monoepoxide, and an aliphatic monoepoxide. In particular, in consideration of the adhesion with a coated surface and curability, an alicyclic monoepoxide is preferably used.

Here, the monofunctional epoxy compound (A) is not an organosiloxane having an epoxy group.

As the alicyclic monoepoxide, a compound containing a cyclohexene oxide or a cyclopentene oxide is preferable which is obtained by epoxidizing a compound having a cycloalkene ring such as a cyclohexene ring or cyclopentene ring with an appropriate oxidizer such as hydrogen peroxide or peroxy acid. From the viewpoint of availability as a commercial product, an oxide of a cyclohexene is preferable, and specific examples thereof include: a cyclohexene oxide having a carboxylic acid ester such as 3,4-epoxycyclohexane carboxylic acid, methyl ester; and a cyclohexene oxide having an alkylene group or an alkyl group such as 1,2-epoxy-4-vinylcyclohexane.

From the viewpoint of improving curability and adhesion, it is preferable that the alicyclic monoepoxide contains a monocarboxylic acid ester of alicyclic monoepoxide. It is preferable that the monocarboxylic acid ester of alicyclic monoepoxide is represented by the following Formula (1). For example, it is more preferable that the monocarboxylic acid ester of alicyclic monoepoxide is 3,4-epoxycyclohexane carboxylic acid, methyl ester.

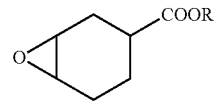

(1)

(In Formula (1), R represents an alkyl group having 1 to 20 carbon atoms.)

In a case where a higher alcohol diester of epoxyhexahydrophthalic acid is used as the alicyclic monoepoxide, when the ink film thickness for printing increases to reduce an effect of an underlayer and to enlarge a reproducible color gamut, that is, when the amount of ink deposited increases to improve the design of a printed matter, the curability and adhesion are superior. In addition, even when a printed matter of the ink is bent, cracking does not occur. Here, as a higher alcohol in the higher alcohol diester of epoxyhexahydrophthalic acid, a higher alcohol having 8 or more carbon atoms is preferable, and examples thereof include octyl alcohol, 2-ethyl hexyl alcohol, dodecyl alcohol, and cetyl alcohol. In particular, octyl alcohol or 2-ethyl hexyl alcohol is preferable from the viewpoint of availability.

An epoxide of a linear alkylene has low reactivity and does not contribute to a reaction in practice. Therefore, in the present invention, an epoxidized linear higher alcohol is also included in the higher alcohol. Specifically, Sansocizer E-PO (manufactured by New Japan Chemical Co., Ltd.; compound name: diepoxy stearyl epoxyhexahydrophthalate) can be used.

It is preferable that the higher alcohol diester of epoxyhexahydrophthalic acid is represented by the following Formula (2).

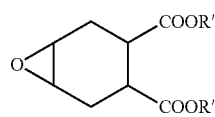

(2)

(In Formula (2), R' represents an alkyl group having 6 to 20 carbon atoms.)

It is preferable that the alicyclic monoepoxide contains both a monocarboxylic acid ester of alicyclic monoepoxide and a higher alcohol diester of epoxyhexahydrophthalic acid. As a result, a photocationically curable inkjet ink having a good balance between curability, adhesion, and flexibility can be obtained.

(Bifunctional Epoxy Compound (B))

The photocationically curable ink jet ink according to the present invention further contains one or more bifunctional epoxy compounds (B) as photocationically polymerizable compounds. Examples of the bifunctional epoxy compound (B) include an aromatic diepoxide, an alicyclic diepoxide (that is, alicyclic bifunctional epoxy compound), and an aliphatic diepoxide. In consideration of the adhesion with a coated surface and curability, a diepoxide having at least one alicyclic epoxy is preferably used. Specific examples of the diepoxide include 1,2-epoxy-4-(2-methyloxiranyl)-1-methyl cyclohexane and 3',4'-epoxycyclohexylmethyl 3,4-epoxycyclohexanecarboxylate.

(Monofunctional Oxetane Compound (C))

In addition, the photocationically curable ink jet ink according to the present invention contains one or more monofunctional oxetane compounds (C) as photocationically polymerizable compounds. The monofunctional oxetane compound (C) is not particularly limited, and examples thereof include 2-ethylhexyl oxetane. Specifically, Aron Oxetane OXT-101, OXT-212, OXT-211, and OXT-213 (all of which are manufactured by Toagosei Co., Ltd.) can be used.

(Bifunctional Oxetane Compound (D))

In addition, the photocationically curable ink jet ink according to the present invention contains one or more bifunctional oxetane compounds (D) as photocationically polymerizable compounds. As the bifunctional oxetane compound (D), for example, 3-ethyl-3{[(3-ethyloxetane-3-yl)methoxy]methyl}oxetane can be used, and specific examples thereof include Aron Oxetane OXT-121 and OXT-221 (both of which are manufactured by Toagosei Co., Ltd.). However, the bifunctional oxetane compound (D) is not limited to these examples.

By using the monofunctional oxetane compound (C) and the bifunctional oxetane compound (D) in combination, the solubility of a dispersant and the adhesion with a coated surface can be well-balanced.

The concentrations of the respective photocationically polymerizable compounds are determined in consideration of, for example, a balance between ink dispersion solubility, ejection stability, curability, and adhesion with a coated surface.

That is, when the concentration of the monofunctional epoxy compound (A) is lower than 20 wt %, the adhesion decreases. When the concentration of the monofunctional epoxy compound (A) is higher than 50 wt %, the curability decreases. Therefore, the concentration of the monofunctional epoxy compound (A) is preferably 20 wt % to 50 wt % and more preferably 30 wt % to 40 wt %.

When the concentration of the bifunctional epoxy compound (B) is lower than 20 wt %, the curability decreases. When the concentration of the bifunctional epoxy compound (B) is higher than 50 wt %, the adhesion decreases. Therefore, the concentration of the bifunctional epoxy compound (B) is preferably 20 wt % to 50 wt % and more preferably 30 wt % to 40 wt %.

When the concentration of the monofunctional oxetane compound (C) is lower than 5 wt %, the ink dispersion stability decreases. When the concentration of the monofunctional oxetane compound (C) is higher than 20 wt %, the solubility of other components decreases, which causes a problem such as the production of a precipitate. Therefore, the concentration of the monofunctional oxetane compound (C) is preferably 5 wt % to 20 wt % and more preferably 5 wt % to 10 wt %.

When the concentration of the bifunctional oxetane compound (D) is lower than 5 wt %, the ink dispersion stability decreases. When the concentration of the bifunctional oxetane compound (D) is higher than 20 wt %, the adhesion decreases. Therefore, the concentration of the bifunctional oxetane compound (D) is preferably 5 wt % to 20 wt % and more preferably 5 wt % to 15 wt %.

(Pigment (E))

The photocationically curable ink jet ink according to the present invention contains the pigment (E). As the pigment (E), various organic pigments and/or inorganic pigments can be used. Specific examples of the pigment (E) include: white pigments such as Titanium Oxide, Zinc Oxide, White Lead, Lithopone, and Antimony Oxide; black pigments such as Aniline Black, Iron Black, and Carbon Black; yellow pigments such as Chrome Yellow, Yellow Iron Oxide, Hansa Yellow (for example, 100, 50, And 30), Titan Yellow, Benzine Yellow, and Permanent Yellow; orange pigments such as Chrome Vermilion, Permanent Orange, Vulcanfast Orange, and Indanthrene Brilliant Orange; brown pigments such as Iron Oxide, Permanent Brown, and Para Brown; red pigments such as red iron oxide, Cadmium Red, Antimony Vermilion, Permanent Red, Rhodamine Lake, Alizalin Lake, Thioindigo Red, PV Carmine, Monolight Fast Red, and quinacridone-based red pigments; violet pigments such as Cobalt Violet, Manganese Violet, Fast Violet, Methyl Violet Lake, Indanthrene Brilliant Violet, and Dioxazine Violet; blue pigments such as Ultramarine Blue, Prussian Blue, Cobalt Blue, Alkali Blue Lake, metal-free Phthalocyanine Blue, Copper Phthalocyanine Blue, Indanthrene Blue, and Indigo; green pigments such as Chrome Green, Chronic Oxide, Emerald Green, Naphthol Green, Green Gold, Acid Green Lake, Malachite Green Lake, Phthalocyanine Green, and Polychloro-Bromo Copper Phthalocyanine; other various fluorescent pigments; metal powder pigments; and extender pigments. The concentration of the pigment (E) in the composition according to the present invention is 0.1 wt % to 20 wt % and preferably 0.5 wt % to 15 wt %.

From the viewpoint of weather resistance, it is preferable that the pigment (E) is an inorganic pigment. When an inorganic pigment is used, a printed matter of the ink has superior weather resistance and thus can be used regardless of being indoors or outdoors.

Examples of the inorganic pigment include: white pigments such as Titanium Oxide, Zinc Oxide, White Lead, Lithopone, and Antimony Oxide; black pigments such as Iron Black; yellow pigments such as Chrome Yellow, Yellow Iron Oxide, and Titan Yellow; orange pigments such as Chrome Vermilion; brown pigments such as Iron Oxide; red pigments such as red iron oxide, Cadmium Red, Antimony Vermilion, and Monolight Fast Red; violet pigments such as Cobalt Violet and Manganese Violet; blue pigments such as Ultramarine Blue and Cobalt Blue; green pigments such as Chrome Green, Chromium Oxide, Emerald Green, and Green Gold; other various fluorescent pigments; metal powder pigments; and extender pigments.

Specifically, as the pigment (E), for example, Sicotrans Yellow L1916 (manufactured by BASF Japan Co., Ltd.), DAIPYROXIDE RED8270 (manufactured by Dainichiseika Color & Chemicals Mfg. Co., Ltd.), Transparent Cobalt Blue CR-4 (manufactured by Asahi Kasei Kogyo Co., Ltd.), Lionel Blue FG-7400 (manufactured by Toyocolor Co., Ltd.), or Mitsubishi Carbon Black MA7 (manufactured by Mitsubishi Chemical Corporation) can be used.

In the photocationically curable ink jet ink according to the present invention, an inorganic pigment is used as the pigment (E) as described above when weather resistance is required, for example, when a printed matter of the ink is used outdoors. However, since the inorganic pigment has a higher effect of blocking ultraviolet rays than an organic pigment, insufficient curing is likely to occur. In the present invention, as photocationically polymerizable compounds, the monofunctional epoxy compound (A), the bifunctional epoxy compound (B), the monofunctional oxetane compound (C), and the bifunctional oxetane compound (D) are used. As a result, the photocationically curable ink jet ink can be made to be superior in curability, solubility of a dispersant, adhesion, and dispersion stability.

(Photoacid Generator (F))

The photoacid generator (F) used in the present invention is a compound capable of producing a material that starts cationic polymerization when irradiated with ultraviolet rays. In particular, an onium salt that produces a Lewis acid when irradiated with light is preferable. Specifically, a diazonium salt of a Lewis acid, an iodonium salt of a Lewis acid, and a sulfonium salt of a Lewis acid can be used. These salts are onium salts in which cation portions are an aromatic diazonium, an aromatic iodonium, and an aromatic sulfonium, respectively, and anion portions are composed of BF4-, PF6-, SbF6-, and [BX4]- (wherein X represents a phenyl group which is substituted with at least two fluorine atoms or trifluoromethyl groups). Specific examples of the onium salt include a phenyldiazonium salt of boron tetrafluoride, a diphenyliodonium salt of phosphorus hexafluoride, a diphenyliodonium salt of antimony hexafluoride, a tri-4-methylphenylsulfonium salt of arsenic hexafluoride, a tri-4-methylphenylsulfonium salt of antimony tetrafluoride, a diphenyliodonium salt of tetrakis(pentafluorophenyl)boron, a mixture of acetylacetone aluminium salt and orthonitrobenzyl silyl ether, a phenylthiopyridium salt, and a phosphorus hexafluoride allene-iron complex.

As commercial products thereof, for example, the following products may be used, for example, CD-1012 (manufactured by Sartomer Company Inc.), PCI-019 and PCI-021 (manufactured by Nippon Kayaku Co., Ltd.), Optomer-SP-150 and Optomer-SP-170 (manufactured by Asahi Denka Co., Ltd.), WI-6990 (manufactured by The Dow Chemical Company), CPI-100P and CPI-100A (manufactured by SAN-APRO Ltd.), TEPBI-S (manufactured by Nippon Shokubai Co., Ltd.), and RHODORSIL PHOTOINITIATOR 2074 (manufactured by Rhodia Inc.).

The concentration of the photoacid generator (F) is 0.1 wt % to 15 wt % with respect to the photocationically curable ink jet ink according to the present invention. When the concentration of the photoacid generator (F) is lower than 0.1 wt %, the curability and adhesion with a substrate is insufficient. When the concentration of the photoacid generator (F) is higher than 15 wt %, ink film properties such as film strength decrease.

Optionally, the following additives can be further added to the photocationically curable ink jet ink according to the present invention, for example, a radically polymerizable compound such as a (meth)acrylate monomer, a (meth)acrylate oligomer, or vinyl (meth)acrylate; a photo-radical initiator, an antifoaming agent, a leveling agent, a polymerization inhibitor, a wax, an antioxidant, a nonreactive polymer, a particulate inorganic filler, a silane coupling agent, a photostabilizer, an ultraviolet absorber, an antistatic agent, a slipping agent, or a solvent.

As the silane coupling agent, for example, an organosiloxane having an epoxy group can be used. Specifically, for example, KBM-403 (manufactured by Shin-Etsu Chemical Co., Ltd.) can be used.

A method of manufacturing a photocationically curable ink jet ink according to the embodiment will be described below.

This manufacturing method includes: a mixing-dispersing step of mixing at least a portion of the pigment (E) with at least a portion of another component to obtain a pigment dispersion; and a post-addition step of adding remaining components to the pigment dispersion. Through the above-described manufacturing steps, the photocationically curable ink jet ink can be stably manufactured. An example of the manufacturing method will be described below in detail.

The photocationically curable ink jet ink according to the present invention is manufactured through the following steps including: mixing (dispersing) the pigment (E) with a solvent, a dispersant, and one or more selected from the photocationically polymerizable compounds to prepare (mixing-dispersing step) a pigment dispersion; and adding (post-addition step) the remaining photocationically polymerizable compounds and the photoacid generator (F) to the pigment dispersion and, optionally, further adding a radically polymerizable compound, a photo-radical initiator, an antifoaming agent, a leveling agent, a polymerization inhibitor, a wax, an antioxidant, a nonreactive polymer, a particulate inorganic filler, a silane coupling agent, a photostabilizer, an ultraviolet absorber, an antistatic agent, a slipping agent, or the like thereto.

Examples of a pigment dispersant which can be used in the present invention include: active agents such as higher fatty acid salts, alkyl sulfates, alkyl ester sulfates, alkyl sulfonates, sulfosuccinates, naphthalene sulfonates, alkyl phosphates, polyoxyalkylene alkyl ether phosphates, polyoxyalkylene alkyl phenyl ethers, glycerol esters, sorbitan esters, and polyoxyethylene fatty acid amides; and block copolymers and random copolymers formed of two or more monomers selected from the group consisting of styrene, styrene derivatives, vinylnaphthalene derivatives, acrylic acid, acrylic acid derivatives, maleic acid, maleic acid derivatives, itaconic acid, itaconic acid derivatives, fumaric acid, and fumaric acid derivatives, and salts thereof. Among these examples, a polymer pigment dispersant having an amine value or having an amine value and an acid value is preferable. The concentration of the dispersant can be 0.1 wt % to 15 wt % with respect to the photocationically curable ink jet ink.

As the dispersant, specifically, for example, Ajisper PB824 or Ajisper PB881 (manufactured by Ajinomoto Fine-Techno Co., Inc.) can be used.

In a dispersing method (mixing-dispersing step) of the pigment (E), for example, various dispersing machines can be used, for example, a ball mill, a bead mill, a sand mill, an attritor, a roll mill, an agitator, a Henschel mixer, a colloid mill, an ultrasonic homogenizer, a pearl mill, a wet jet mill, and a paint shaker. In addition, a centrifuge or a filter may also be used to remove coarse particles in the pigment dispersion.

In the post-addition step, the remaining materials are added to the obtained pigment dispersion, and the components are mixed with each other and stirred using, for example, a homogenizer. Next, optionally, the mixture is filtered through a glass filter or the like. As a result, a photocationically curable ink jet ink can be obtained. The post-addition step is performed in a light-shielded state in a dry air atmosphere. As the glass filter, for example, a glass filter having a pore size of 0.5 μm or more and 5 μm or less can be used.

It is preferable that the bifunctional epoxy compound (B) is added only in the post-addition step. As a result, an increase in viscosity can be prevented, and the photocationically curable ink jet ink can be more stably manufactured.

The viscosity of the photocationically curable ink jet ink according to the present invention at 25° C. is preferably 3 mPa·sec to 60 mPa·sec. Within the above-described viscosity, the desired viscosity can be easily adjusted by adjusting the temperature of the ink.

When the photocationically curable ink jet ink is left to stand at 45° C. for 3 days, a viscosity increase rate thereof is adjusted to be preferably 9% or lower and more preferably 5% or lower by adjusting the components, a balance between the contents of the components, the preparation method, and the like. In addition, the viscosity increase rate is adjusted to be preferably 0% or higher. As a result, a photocationically curable ink jet ink having superior stability can be manufactured. Here, the viscosity increase rate when left to stand at 45° C. for 3 days refers to, specifically, a value which is obtained from the expression (b−a)/a×100 (%), wherein a represents the initial viscosity at 25° C., and b represents the viscosity at 25° C. after being left to stand at 45° C. for 3 days.

When the photocationically curable ink jet ink is left to stand at 5° C. for 3 days, a viscosity increase rate thereof is adjusted to be preferably 4% or lower and more preferably 2% or lower by adjusting the components, a balance between the contents of the components, the preparation method, and the like. In addition, the viscosity increase rate is preferably −2% or higher and more preferably −1% or higher. As a result, a photocationically curable ink jet ink having superior stability can be manufactured. Here, the viscosity increase rate when left to stand at 5° C. for 3 days refers to, specifically, a value which is obtained from the expression (c−a)/a×100(%), wherein a represents the initial viscosity at 25° C., and c represents the viscosity at 25° C. after being left to stand at 5° C. for 3 days.

A method of manufacturing a printed matter according to the embodiment will be described below.

The method of manufacturing a printed matter includes: a step of adhering the photocationically curable ink jet ink according to the embodiment to a substrate; and a step of irradiating the adhered photocationically curable ink jet ink with energy rays to cure the photocationically curable ink jet ink. Although not particularly limited thereto, the substrate may be obtained by coating, for example, a steel sheet or an iron sheet with a curable resin and curing the curable resin. The energy rays refer to, for example, light containing ultraviolet rays having a wavelength of 210 nm to 280 nm. Hereinafter, the details will be described.

The photocationically curable inkjet ink is adhered to a coated steel sheet or the like using an ink jet printer on which a piezoelectric ink jet head is mounted. A droplet of the ink ejected from the ink jet printer is, for example, 3 μL or more and 100 μL or less. Next, the ink is cured by being irradiated with active energy rays using, for example, a high-pressure mercury lamp to obtain a printed matter. In the step of curing the ink, the energy rays are irradiated at a cumulative light intensity of 300 mJ/cm$^2$ or higher and 750 mJ/cm$^2$ or lower in a wavelength range of 260 nm to 400 nm. The irradiation may be performed through multiple steps or at one time to cure the ink.

In addition, in ink jet printing, particularly when an inorganic pigment is used for a coated object or a printed matter which is used outdoors, the maximum ink film thickness in the printed matter is generally about 8 μm. However, in order to reduce an effect of an underlayer and to obtain a printed matter having a good design, the maximum ink film thickness is preferably 10 μm or more. On the other hand, from the viewpoint of easily curing the ink, the maximum ink film thickness in the printed matter is preferably 30 μm or less. In the present invention, a higher alcohol diester of epoxyhexahydrophthalic acid, which is an alicyclic monoepoxide, can be used as the monofunctional epoxy compound (A). As a result, even in a case where the ink film thickness in the printed matter is more than 10 μm to reduce an effect of an underlayer and to enlarge a reproducible color gamut, cracking does not occur, for example, when the printed matter is bent. In particular, in the case of a water-based ink or a solvent-based ink, there may be a difference between the thickness of the ink film before being dried and the thickness of the ink film after being dried and cured (solidified). However, the ink film thickness described herein refers to the thickness of the cured ink film in the printed matter.

The photocationically curable ink jet ink according to the present invention is printed on a coated surface or the like using, for example, an inkjet recording apparatus. For example, the coated surface according to the present invention is obtained by coating, for example, a steel sheet or an iron sheet, which is a substrate, with a curable resin and curing the curable resin. The photocationically curable ink jet ink according to the present invention has superior adhesion with, in particular, a coated surface of a melamine thermosetting resin. Accordingly, when a surface of the substrate is a coated surface of a melamine thermosetting resin and when an image is printed on the surface, the photocationically curable ink jet ink according to the present invention is more efficient.

The photocationically curable ink jet ink according to the embodiment exhibits superior dispersion stability and superior adhesion and curability in a printed matter.

EXAMPLES

Hereinafter, the present invention will be described in more detail using Examples. However, the present invention is not limited to these Examples. In Examples, "part(s)" represents "part(s) by weight", and "%" represents "wt %".

Tables 1 and 2 show the compositions of Examples, and Table 3 shows the compositions of Comparative Examples. In addition, Table 4 shows compound names of materials used in Tables 1 to 3. In Tables 1 to 3, the unit of the composition in each of Examples is "wt %". Here, the total amount of a photocationically curable ink jet ink for a coated surface is 100 wt %.

TABLE 1

| Step | | Materials Used | Manufacturer | Example 1 | 2 | 3 | 4 | 5 | 6 | 7 | 8 | 9 |
|---|---|---|---|---|---|---|---|---|---|---|---|---|
| Mixing-Dispersing Step (Pigment Dispersion) | Bifunctional Oxetane Compound (D) | Aron Oxetane OXT-221 | Toagosei Co., Ltd. | 6.72 | 6.72 | 6.72 | 6.72 | 6.72 | 6 | 6 | 5 | 11.5 |
| | Monofunctional Oxetane Compound (C) | Aron Oxetane OXT-212 | Toagosei Co., Ltd. | | | | | | 5 | 5 | 5 | 10 |
| | Monofunctional Epoxy Compound (A) | Syna-Epoxy 30 | Synasia Co., Ltd. | | | | | | | | 8 | |
| | Dispersant | Ajisper PB824 | Ajinomoto Fine-Techno Co., Inc. | 0.42 | 0.42 | 0.42 | 0.42 | 0.42 | 1.5 | 1.5 | | 1 |
| | | Ajisper PB881 | Ajinomoto Fine-Techno Co., Inc. | | | | | | | | 2.4 | |
| | Silane Coupling Agent | KBM-403 | Shin-Etsu Chemical Co., Ltd. | | | | | | 5 | 5 | 8 | |
| | Pigment (E) | Sicotrans Yellow L1916 | BASF Japan Co., Ltd. | | | | | | 7.5 | | | |
| | | DAIPYROXIDE RED8270 | Dainichiseika Color & Chemicals Mfg. Co., Ltd. | | | | | | | 7.5 | | |
| | | Transparent Cobalt Blue CR-4 | Asahi Kasei Kogyo Co., Ltd. | | | | | | | | 12 | |
| | | Lionel Blue FG-7400 | Toyocolor Co., Ltd. | | | | | | | | | 2.5 |
| | | Mitsubishi Carbon Black MA7 | Mitsubishi Chemical Corporation | 1.26 | 1.26 | 1.26 | 1.26 | 1.26 | | | | |
| Post-Addition Step | Bifunctional Epoxy Compound (B) | Celloxide 2021P | Daicel Corporation | 20 | 20 | 20 | 20 | 20 | 20 | 20 | 10 | 20 |
| | | LDO | ARKEMA Inc. | 10 | 10 | 16 | | 25 | 20 | 20 | 20 | 20 |
| | Monofunctional Epoxy Compound (A) | Syna-Epoxy 30 | Synasia Co., Ltd. | 40 | | | 50 | 25 | 30 | 30 | 24.6 | 30 |
| | | Celloxide 2000 | Daicel Corporation | | 40 | 45.6 | | | | | | |
| | | Sansocizer E-PS | New Japan Chemical Co., Ltd. | | | | | | | | | |
| | | Sansocizer E-PO | New Japan Chemical Co., Ltd. | | | | | | | | | |
| | Bifunctional Oxetane Compound (D) | Aron Oxetane OXT-221 | Toagosei Co., Ltd. | 8 | 8 | 0 | 8 | 8 | | | | |
| | Monofunctional Oxetane Compound (C) | Aron Oxetane OXT-212 | Toagosei Co., Ltd. | 8.6 | 8.6 | 5 | 8.6 | 8.6 | | | | |
| | Photoacid Generator (F) | CPI-100P (PC 50% Solution) | San-Apro Ltd. | 5 | 5 | 5 | 5 | 5 | 5 | 5 | 5 | 5 |
| | | Total | | 100 | 100 | 100 | 100 | 100 | 100 | 100 | 100 | 100 |

TABLE 2

| Step | | Materials Used | Manufacturer | Example 10 | 11 | 12 | 13 | 14 | 15 | 16 |
|---|---|---|---|---|---|---|---|---|---|---|
| Mixing Dispersing Step (Pigment Dispersion) | Bifunctional Oxetane Compound (D) | Aron Oxetane OXT-221 | Toagosei Co., Ltd. | 6.72 | 6.72 | 6 | 6 | 5 | 11.5 | 6.72 |
| | Monofunctional Oxetane Compound (C) | Aron Oxetane OXT-212 | Toagosei Co., Ltd. | | | 5 | 5 | 5 | 10 | |
| | Monofunctional Epoxy Compound (A) | Syna-Epoxy 30 | Synasia Co., Ltd. | | | | | | 8 | |
| | Dispersant | Ajisper PB824 | Ajinomoto Fine-Techno Co., Inc. | | | 1.5 | 1.5 | | 1 | 0.42 |
| | | Ajisper PB881 | Ajinomoto Fine-Techno Co., Inc. | 0.42 | 0.42 | | | 2.4 | | |
| | Silane Coupling Agent | KBM-403 | Shin-Etsu Chemical Co., Ltd. | | | 5 | 5 | 8 | | |
| | Pigment (E) | Sicotrans Yellow L1916 | BASF Japan Co., Ltd. | | | | 7.5 | | | |
| | | DAIPYROXIDE RED8270 | Dainichiseika Color & Chemicals Mfg. Co., Ltd. | | | | | 7.5 | | |
| | | Transparent Cobalt Blue CR-4 | Asahi Kasei Kogyo Co., Ltd. | | | | | | 12 | |
| | | Lionel Blue FG-7400 | Toyocolor Co., Ltd. | | | | | | 2.5 | |
| | | Mitsubishi Carbon Black MA7 | Mitsubishi Chemical Corporation | 1.26 | 1.26 | | | | | 1.26 |
| Post-Addition Step | Bifunctional Epoxy Compound (B) | Celloxide 2021P | Daicel Corporation | 20 | 20 | | | | | 20 |
| | | LDO | ARKEMA Inc. | 10 | 10 | 40 | 40 | 30 | 40 | 10 |
| | Monofunctional Epoxy Compound (A) | Syna-Epoxy 30 | Synasia Co., Ltd. | 30 | 10 | | | | | 10 |
| | | Celloxide 2000 | Daicel Corporation | | | | | | | |
| | | Sansocizer E-PS | New Japan Chemical Co., Ltd. | 10 | 30 | 30 | 30 | 24.6 | 30 | |
| | | Sansocizer E-PO | New Japan Chemical Co., Ltd. | | | | | | | 30 |
| | Bifunctional Oxetane Compound (D) | Aron Oxetane OXT-221 | Toagosei Co., Ltd. | 8 | 8 | | | | | 8 |
| | Monofunctional Oxetane Compound (C) | Aron Oxetane OXT-212 | Toagosei Co., Ltd. | 8.6 | 8.6 | | | | | 8.6 |
| | Photoacid Generator (F) | CPI-100P (PC 50% Solution) | San-Apro Ltd. | 5 | 5 | 5 | 5 | 5 | 5 | 5 |
| | | Total | | 100 | 100 | 100 | 100 | 100 | 100 | 100 |

TABLE 3

| Step | | Materials Used | Manufacturer | Comparative Example 1 | 2 | 3 | 4 | 5 | 6 |
|---|---|---|---|---|---|---|---|---|---|
| Mixing Dispersing Step (Pigment Dispersion) | Bifunctional Oxetane Compound (D) | Aron Oxetane OXT-221 | Toagosei Co., Ltd. | | | 6.72 | 6.72 | 6.72 | |
| | Monofunctional Oxetane Compound (C) | Aron Oxetane OXT-212 | Toagosei Co., Ltd. | | | | | | 6.72 |
| | Monofunctional Epoxy Compound (A) | Syna-Epoxy 30 | Synasia Co., Ltd. | 6.72 | 6.72 | | | | |
| | Dispersant | Ajisper PB824 | Ajinomoto Fine-Techno Co., Inc. | 0.42 | 0.42 | 0.42 | 0.42 | 0.42 | 0.42 |
| | Pigment (E) | Mitsubishi Carbon Black MA7 | Mitsubishi Chemical Corporation | 1.26 | 1.26 | 1.26 | 1.26 | 1.26 | 1.26 |
| Post-Addition Step | Bifunctional Epoxy Compound (B) | Celloxide 2021P | Daicel Corporation | 20 | 20 | 20 | | 20 | 20 |
| | | LDO | ARKEMA Inc. | 20 | 20 | 10 | | 10 | 10 |
| | Monofunctional Epoxy Compound (A) | Syna-Epoxy 30 | Synasia Co., Ltd. | 46.6 | 38 | 40 | 40 | | 40 |
| | | Celloxide 2000 | Daicel Corporation | | | | | | |
| | Bifunctional Oxetane Compound (D) | Aron Oxetane OXT-221 | Toagosei Co., Ltd. | | | 16.6 | 38 | 8 | |

TABLE 3-continued

| | | | Comparative Example | | | | | |
|---|---|---|---|---|---|---|---|---|
| Step | Materials Used | Manufacturer | 1 | 2 | 3 | 4 | 5 | 6 |
| Monofunctional Oxetane Compound (C) | Aron Oxetane OXT-212 | Toagosei Co., Ltd. | | 8.6 | | 8.6 | 48.6 | 16.6 |
| Photoacid Generator (F) | CPI-100P (PC 50% Solution) | San-Apro Ltd. | 5 | 5 | 5 | 5 | 5 | 5 |
| | | Total | 100 | 100 | 100 | 100 | 100 | 100 |

TABLE 4

| Materials Used | Compound Name |
|---|---|
| Ajisper PB824 | Polymer Dispersant |
| Ajisper PB881 | Polymer Dispersant |
| KBM-403 | 3-Glycidoxypropyl Trimethoxysilane |
| Sicotrans Yellow L1916 | Iron Oxide Pigment |
| DAIPYROXIDE RED8270 | Iron Oxide Pigment |
| Transparent Cobalt Blue CR-4 | Cobalt Blue |
| Lionel Blue FG-7400 | Copper Phthalocyanine Blue |
| Mitsubishi Carbon Black MA7 | Carbon Black |
| Celloxide 2021P | 3',4'-Epoxycyclohexylmethyl 3,4-Epoxycyclohexanecarboxylate |
| LDO | 1,2-Epoxy-4-(2-Methyloxiranyl)-1-Methyl Cyclohexane |
| Syna-Epoxy 30 | 3,4-Epoxycyclohexane Carboxylic Acid, Methyl Ester |
| Celloxide 2000 | 1,2-Epoxy-4-Vinylcyclohexane |
| Sansocizer E-PS | Di-2-Ethylhexyl Epoxyhexahydrophthalate |
| Sansocizer E-PO | Diepoxy Stearyl Epoxyhexahydrophthalate |
| Aron Oxetane OXT-221 | 3-Ethyl-3-{[(3-Ethyloxetane-3-yl)Methoxy]Methyl}Oxetane |
| Aron Oxetane OXT-212 | 2-Ethyhexyl Oxetane |
| CPI-100P (PC 50% Solution) | Monosulfonium Salt (Propioncarbonate 50% Solution) |

Example 1

Materials of a pigment dispersion of Example 1 of Table 1 were pre-mixed with each other and were treated with a sand mill for 4 hours to obtain a pigment dispersion (mixing-dispersing step). In a light-shielded state, the remaining materials were added to the obtained pigment dispersion in a dry air atmosphere and were mixed and stirred using a homomixer for 30 minutes (post-addition step). Next, the mixture underwent pressure filtration using a glass filter having a pore size of 2 μm. As a result, a photocationically curable ink jet ink for coating of Example 1 was obtained.

Examples 2 to 16, Comparative Examples 1 to 6

According to the compositions of Examples 2 to 9 of Table 1, photocationically curable ink jet inks for a coated surface of Examples 2 to 9 were obtained using the same method as in Example 1. In addition, according to the compositions of Examples 10 to 16 of Table 2, photocationically curable ink jet inks for a coated surface of Examples 10 to 16 were obtained using the same method as in Example 1. In addition, according to the compositions of Comparative Examples 1 to 6 of Table 3, ink jet inks of Comparative Examples 1 to 6 were obtained using the same method as in Example 1.

Examples and Comparative Examples were evaluated in the following four items including storage stability (dispersion stability), the number of passes for photocuring (curability), adhesion, and flexibility.

<Storage Stability>

The inks of Examples and Comparative Examples were stored for 3 days in an oven at 5° C. and 45° C. A case where a viscosity change was lower than ±10% from the initial viscosity and where precipitation, sedimentation, and the like did not occur was evaluated as "Pass (○)". Regarding the viscosity change, the viscosity was measured using a cone-plate type viscometer TV-22 (manufactured by Toki Sangyo Co., Ltd.) at 25° C.

<Viscosity Change Caused by Storage>

Immediately after the preparation, the inks of Examples and Comparative Examples were left to stand at 45° C. for 3 days. After returning the temperature to 25° C., the viscosity each of the inks was measured. An increase rate was obtained based on the initial viscosity of the prepared ink which was measured at 25° C. The results are shown in Tables 5 and 6. In order to measure the viscosity, a cone-plate type viscometer TV-22 (manufactured by Toki Sangyo Co., Ltd.) was used.

Similarly, an increase rate of the viscosity of the prepared ink when left to stand at 5° C. for 3 days was obtained, and the results thereof are shown in Tables 5 and 6.

<Curability (Number of Passes for Photocuring)>

With each of the inks of Examples and Comparative Examples, a solid image was printed on a coated steel sheet (IG Ivory, manufactured by JFE Galvanizing & Coating Co., Ltd.), which was coated with a melamine resin and was thermally cured, at a resolution of 360 dpi×360 dpi using an ink jet printer on which a piezoelectric ink jet head (KM512LH, manufactured by Konica Minolta Inc.) was mounted. Using a high-pressure mercury lamp, the ink was irradiated with active energy rays at a cumulative light intensity of 150 mJ/cm$^2$ in a wavelength range of 260 nm to 400 nm for each irradiation to obtain a film. Next, while observing the film by finger touch, the surface thereof was cured, and the number of irradiation times (number of passes) required to remove tackiness was obtained. It can be said that, the less the number of irradiation times (number of passes), the higher photo-curability. A case where the number of irradiation times was 5 or less was evaluated as "○", and a case where the number of irradiation times was more than 5 was evaluated as "x". In addition, when ink jet printing was performed at a resolution of 360 dpi×360 dpi, it was found that both the thicknesses of the printed ink film before and after curing were 7.8 μm.

In addition, the curability was evaluated using the same method as described above, except that the printing resolution was changed to 720 dpi×360 dpi. When ink jet printing was performed at a resolution of 720 dpi×360 dpi, it was found that both the thicknesses of the printed ink film before and after curing were 15.6 μm.

<Adhesion>

With each of the inks of Examples and Comparative Examples, a solid image was printed on a surface of a coated steel sheet (IG Ivory, manufactured by JFE Galvanizing & Coating Co., Ltd.) at a resolution of 360 dpi×360 dpi using an ink jet printer on which a piezoelectric ink jet head (KM512LH, manufactured by Konica Minolta Inc.) was mounted. The solid-printed matter was cured by irradiation of active energy rays in the number of passes obtained above in "Number of Passes for Photocuring". Next, after an x-shaped notch was formed on each cured film, a cellophane adhesive tape was adhered thereto and then peeled off therefrom. At this time, a case where the cured film was not peeled off was evaluated as "○", and a case where the cured film was peeled off was evaluated as "x".

In addition, the adhesion was evaluated using the same method as described above, except that the printing resolution was changed to 720 dpi×360 dpi.

<Flexibility>

Using a specimen obtained in the evaluation for "Curability (Number of Passes for Photocuring)", a test was performed according to JIS K-5600-5-1. A case where neither cracking nor peeling occurred was evaluated as "○", a case where only cracking occurred was evaluated as "Δ", and a case where both cracking and peeling occurred was evaluated as "x". In the test, the printing resolution was 720 dpi×360 dpi.

The evaluation results of Examples are shown in Table 5, and the evaluation results of Comparative Examples are shown in Table 6. It was found from the results of Tables 5 and 6 that all the ink jet inks of Examples 1 to 16 were superior in storage stability, curability, and adhesion regardless of the kinds of the pigments. On the other hand, all the ink jet inks of Comparative Examples were not superior in storage stability, curability, and adhesion. In Comparative Example 6, no dispersant was dissolved, the subsequent evaluation was not performed.

It was found that the ink jet inks of Examples 10 to 15 contained a higher alcohol diester of epoxyhexahydrophthalic acid, which is an alicyclic monoepoxide, as the monofunctional epoxy compound and thus were superior not only in storage stability, curability, and adhesion but also in flexibility.

It was found that the inkjet ink of Example 16 contained diepoxy stearyl epoxyhexahydrophthalate, which is a triepoxide, as the alicyclic monoepoxide and thus were superior not only in storage stability, curability, and adhesion but also in flexibility. It is considered that, when the crosslinking density is excessively high during polymerization, flexibility is poor. Therefore, based on the fact that the flexibility is superior, it is presumed that the epoxy in a side chain of the diepoxy stearyl epoxyhexahydrophthalate did not contribute to a reaction.

TABLE 6

| Evaluation Item | Comparative Example | | | | | |
|---|---|---|---|---|---|---|
| | 1 | 2 | 3 | 4 | 5 | 6 |
| Storage Stability | x | x | ○ | ○ | ○ | — |
| Viscosity Increase Rate (45° C.) (%) | 12 | 10 | 1 | 0 | 1 | — |
| Viscosity Increase Rate (5° C.) (%) | 5 | 6 | 0 | 0 | 2 | — |
| Curability (360 dpi × 360 dpi) | x | x | ○ | ○ | x | — |
| Curability (720 dpi × 360 dpi) | x | x | ○ | ○ | x | — |
| Adhesion (360 dpi × 360 dpi) | ○ | ○ | x | x | x | — |
| Adhesion (720 dpi × 360 dpi) | ○ | ○ | x | x | x | — |
| Flexibility | Δ | Δ | Δ | x | Δ | — |

Hereinbefore, the embodiment of the present invention has been described. However, the embodiment is merely an example of the present invention, and various configurations other than the above-described configurations can also be adopted. Hereinafter, an example of a reference embodiment will be added.

(1) A photocationically curable ink jet ink for a coated surface, the photocationically curable ink jet ink including:
 a photoacid generator;
 a pigment; and
 photocationically polymerizable compounds that includes a monofunctional epoxy compound, a bifunctional epoxy compound, a monofunctional oxetane compound, and a bifunctional oxetane compound.

(2) The photocationically curable ink jet ink for a coated surface according to (1),
 in which a concentration of the monofunctional epoxy compound is 20 wt % to 50 wt %,
 a concentration of the bifunctional epoxy compound is 20 wt % to 50 wt %,
 a concentration of the monofunctional oxetane compound is 5 wt % to 20 wt %, and
 a concentration of the bifunctional oxetane compound is 5 wt % to 20 wt %.

(3) The photocationically curable ink jet ink for a coated surface according to (1) or (2),
 in which the monofunctional epoxy compound is an alicyclic monofunctional epoxy compound.

(4) The photocationically curable ink jet ink for a coated surface according to any one of (1) to (3),
 in which the bifunctional epoxy compound is an alicyclic bifunctional epoxy compound.

(5) The photocationically curable ink jet ink for a coated surface according to any one of (1) to (4),
 in which the pigment is an inorganic pigment.

(6) A printed matter which is obtained by printing the photocationically curable ink jet ink for a coated surface

TABLE 5

| Evaluation Item | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Storage Stability | ○ | ○ | ○ | ○ | ○ | ○ | ○ | ○ | ○ | ○ | ○ | ○ | ○ | ○ | ○ | ○ |
| Viscosity Increase Rate (45° C.) (%) | 1 | 0 | 0 | 1 | 0 | 0 | 1 | 1 | 0 | 0 | 0 | 2 | 3 | 1 | 0 | 0 |
| Viscosity Increase Rate (5° C.) (%) | 0 | 0 | 0 | 0 | 0 | 0 | 1 | 0 | 0 | 0 | 0 | −1 | 1 | 0 | 0 | 0 |
| Curability (360 dpi × 360 dpi) | ○ | ○ | ○ | ○ | ○ | ○ | ○ | ○ | ○ | ○ | ○ | ○ | ○ | ○ | ○ | ○ |
| Curability (720 dpi × 360 dpi) | ○ | ○ | ○ | ○ | ○ | ○ | ○ | ○ | ○ | ○ | ○ | ○ | ○ | ○ | ○ | ○ |
| Adhesion (360 dpi × 360 dpi) | ○ | ○ | ○ | ○ | ○ | ○ | ○ | ○ | ○ | ○ | ○ | ○ | ○ | ○ | ○ | ○ |
| Adhesion (720 dpi × 360 dpi) | ○ | ○ | ○ | ○ | ○ | ○ | ○ | ○ | ○ | ○ | ○ | ○ | ○ | ○ | ○ | ○ |
| Flexibility | Δ | Δ | Δ | Δ | Δ | Δ | Δ | Δ | Δ | ○ | ○ | ○ | ○ | ○ | ○ | ○ | according to any one of (1) to (5) using an ink jet method and curing the ink with light containing ultraviolet rays having a wavelength of 210 nm to 280 nm.

The present application claims priority based on Japanese Patent Application No. 2013-209864 filed on Oct. 7, 2013, the entire content of which is incorporated herein by reference.

The invention claimed is:

1. A photocationically curable ink jet ink comprising:
a photoacid generator;
a pigment;
a monofunctional epoxy compound (excluding an organosiloxane having an epoxy group);
a bifunctional epoxy compound;
a monofunctional oxetane compound; and
a bifunctional oxetane compound,
wherein a concentration of the monofunctional epoxy compound is 20 wt % to 50 wt %,
a concentration of the bifunctional epoxy compound is 20 wt % to 50 wt %,
a concentration of the monofunctional oxetane compound is 5 wt % to 20 wt %, and
a concentration of the bifunctional oxetane compound is 5 wt % to 20 wt %.

2. The photocationically curable ink jet ink according to claim 1,
wherein the monofunctional epoxy compound contains an alicyclic monoepoxide.

3. The photocationically curable ink jet ink according to claim 2,
wherein the alicyclic monoepoxide contains a monocarboxylic acid ester of alicyclic monoepoxide.

4. The photocationically curable ink jet ink according to claim 2,
wherein the alicyclic monoepoxide contains a higher alcohol diester of epoxyhexahydrophthalic acid.

5. The photocationically curable ink jet ink according to claim 2,
wherein the alicyclic monoepoxide contains a monocarboxylic acid ester of alicyclic monoepoxide and a higher alcohol diester of epoxyhexahydrophthalic acid.

6. The photocationically curable ink jet ink according to claim 1,
wherein the bifunctional epoxy compound contains an alicyclic bifunctional epoxy compound.

7. The photocationically curable ink jet ink according to claim 1,
wherein the pigment contains an inorganic pigment.

8. The photocationically curable ink jet ink according to claim 1,
wherein when left to stand at 45° C. for 3 days, a viscosity increase rate is 0% or higher and 9% or lower.

9. A method of manufacturing the photocationically curable ink jet ink according to claim 1,
the method comprising:
a mixing-dispersing step of mixing at least a portion of the pigment with at least one component selected from the monofunctional epoxy compound, the bifunctional epoxy compound, the monofunctional oxetane compound, and the bifunctional oxetane compound to obtain a pigment dispersion; and
a post-addition step of adding remaining components to the pigment dispersion.

10. The method of manufacturing a photocationically curable ink jet ink according to claim 9,
wherein the bifunctional epoxy compound is added only in the post-addition step.

11. A method of manufacturing a printed matter, the method comprising:
a step of adhering the photocationically curable ink jet ink according to claim 1 to a substrate; and
a step of irradiating the adhered photocationically curable ink jet ink with energy rays to cure the photocationically curable ink jet ink.

12. A printed matter which is obtained using the method of manufacturing a printed matter according to claim 11.

13. The printed matter according to claim 12, herein a maximum ink film thickness of the cured photocationically curable ink jet ink on the substrate is 10 μm or more and 30 μm or less.

14. The photocationically curable ink jet ink according to claim 3,
wherein the bifunctional epoxy compound contains an alicyclic bifunctional epoxy compound.

15. The photocationically curable ink jet ink according to claim 4,
wherein the bifunctional epoxy compound contains an alicyclic bifunctional epoxy compound.

16. The photocationically curable ink jet ink according to claim 5,
wherein the bifunctional epoxy compound contains an alicyclic bifunctional epoxy compound.

17. The photocationically curable ink jet ink according to claim 3,
wherein the pigment contains an inorganic pigment.

18. The photocationically curable ink jet ink according to claim 4,
wherein the pigment contains an inorganic pigment.

19. The photocationically curable ink jet ink according to claim 5,
wherein the pigment contains an inorganic pigment.

20. A photocationically curable ink jet ink comprising:
a photoacid generator;
a pigment;
a monofunctional epoxy compound (excluding an organosiloxane having an epoxy group);
a bifunctional epoxy compound;
a monofunctional oxetane compound; and
a bifunctional oxetane compound,
wherein the monofunctional epoxy compound contains an alicyclic monoepoxide.

21. The photocationically curable ink jet ink according to claim 20,
wherein a concentration of the monofunctional epoxy compound is 20 wt % to 50 wt %,
a concentration of the bifunctional epoxy compound is 20 wt % to 50 wt %,
a concentration of the monofunctional oxetane compound is 5 wt % to 20 wt %, and
a concentration of the bifunctional oxetane compound is 5 wt % to 20 wt %.

22. The photocationically curable ink jet ink according to claim 20,
wherein the alicyclic monoepoxide contains a monocarboxylic acid ester of alicyclic monoepoxide.

23. The photocationically curable ink jet ink according to claim 20,
wherein the alicyclic monoepoxide contains a higher alcohol diester of epoxyhexahydrophthalic acid.

24. The photocationically curable ink jet ink according to claim 20,
wherein the alicyclic monoepoxide contains a monocarboxylic acid ester of alicyclic monoepoxide and a higher alcohol diester of epoxyhexahydrophthalic acid.

25. The photocationically curable ink jet ink according to claim 20,
  wherein the bifunctional epoxy compound contains an alicyclic bifunctional epoxy compound.

26. The photocationically curable ink jet ink according to claim 20,
  wherein the pigment contains an inorganic pigment.

27. The photocationically curable ink jet ink according to claim 20,
  wherein when left to stand at 45° C. for 3 days, a viscosity increase rate is 0% or higher and 9% or lower.

* * * * *